July 13, 1943.  F. A. BERNER  2,324,352
ANTI-SKID DEVICE
Filed April 16, 1942  4 Sheets-Sheet 2

INVENTOR.
Francis A. Berner
BY Archworth Martin
ATTORNEY.

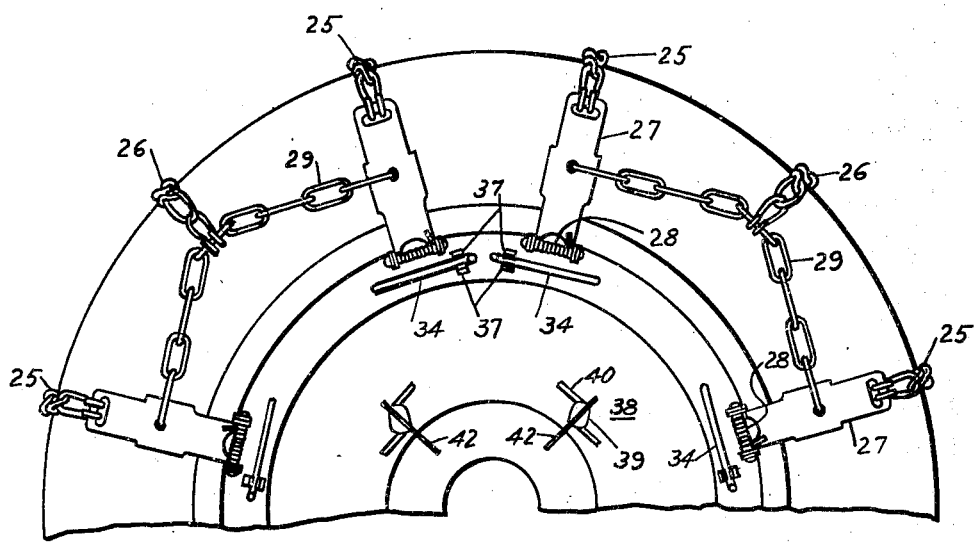
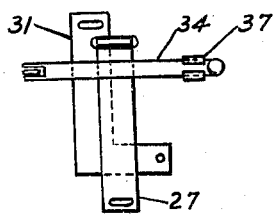
Fig. 6
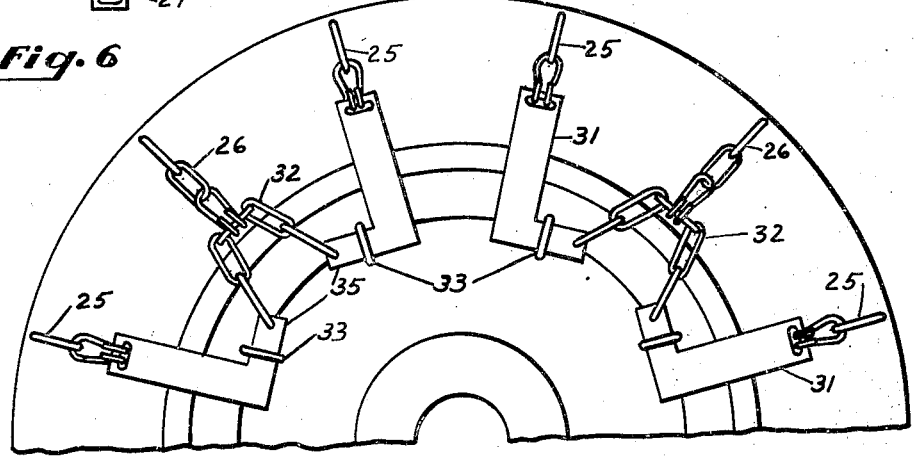
Fig. 5

July 13, 1943.  F. A. BERNER  2,324,352
ANTI-SKID DEVICE
Filed April 16, 1942  4 Sheets-Sheet 4

INVENTOR.
Francis A Berner
BY Archworth Martin

Patented July 13, 1943

2,324,352

UNITED STATES PATENT OFFICE 2,324,352

ANTISKID DEVICE

Francis A. Berner, Allison Park, Pa.

Application April 16, 1942, Serial No. 439,172

8 Claims. (Cl. 152—237)

My invention relates to antiskid devices and more particularly to those of the type commonly applied to automobile wheels to prevent slipping and skidding.

One object of my invention is to provide an antiskid device of improved form which can readily be applied to a wheel, without the necessity of the user reaching behind the wheel or backing up the car.

Another object of my invention is to provide an antiskid structure which may first be connected to the outer side or rim of a wheel and then draped across the tire or wheel tread and securely fastened at the rear side thereof through operation of attaching elements that are conveniently accessible to a user standing at the side of the vehicle.

Another object of my invention is to provide an antiskid structure that may conveniently be stored in a holder or receptacle at the outer side of the wheel, ready to place in its functioning position, during seasons when occasion frequently arises for its use, and which can easily be removed during summer seasons.

A further object of my invention is to provide an antiskid structure of the character referred to, which is of such form that it may be employed in connection with disc wheels.

Figure 1:
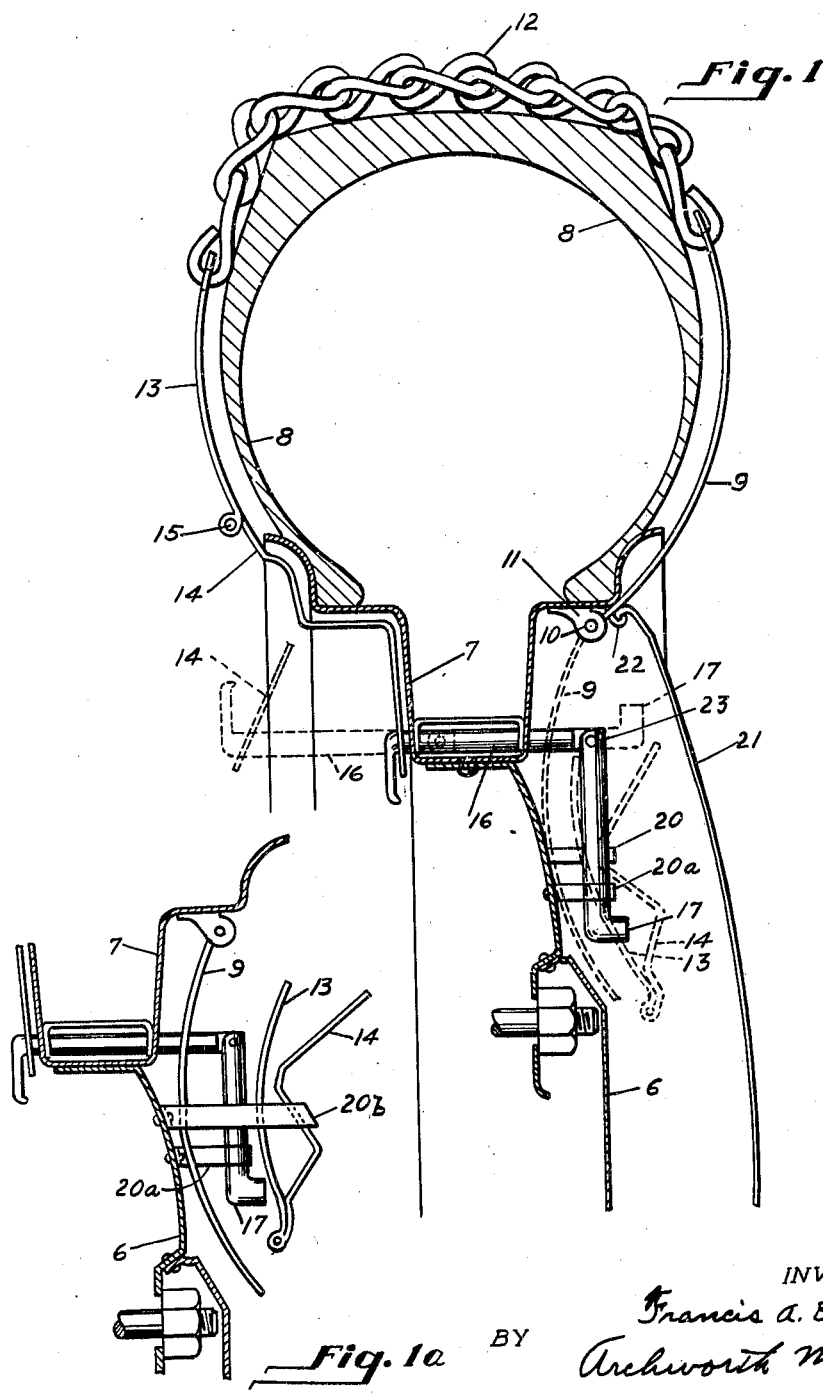
Figure 2:
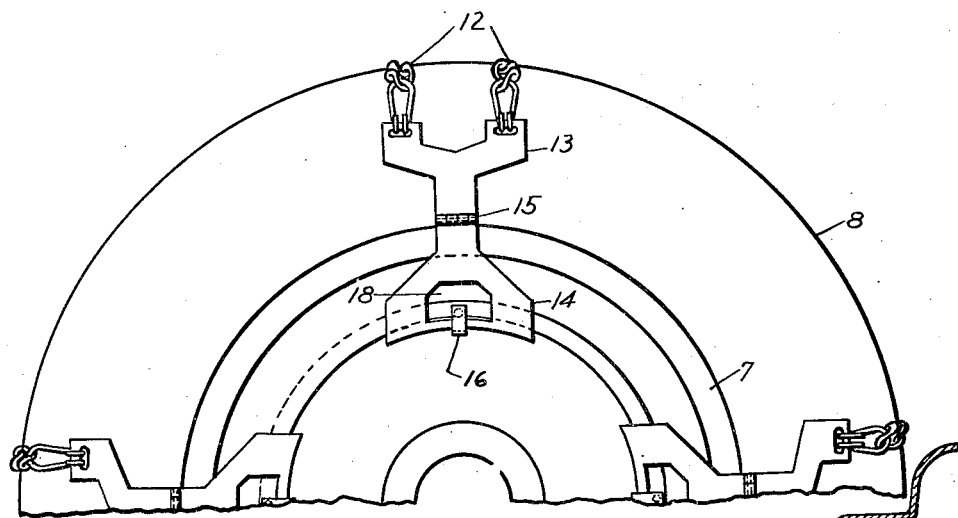
Figure 3B:
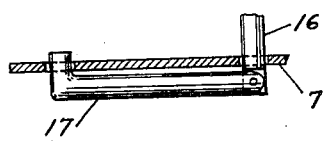
Figure 3A:
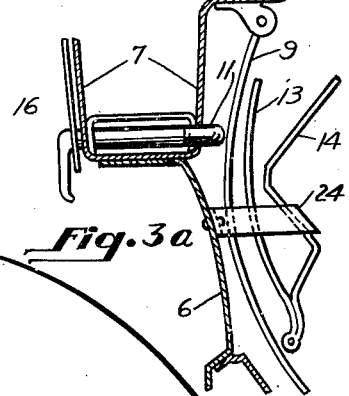
Figure 3:
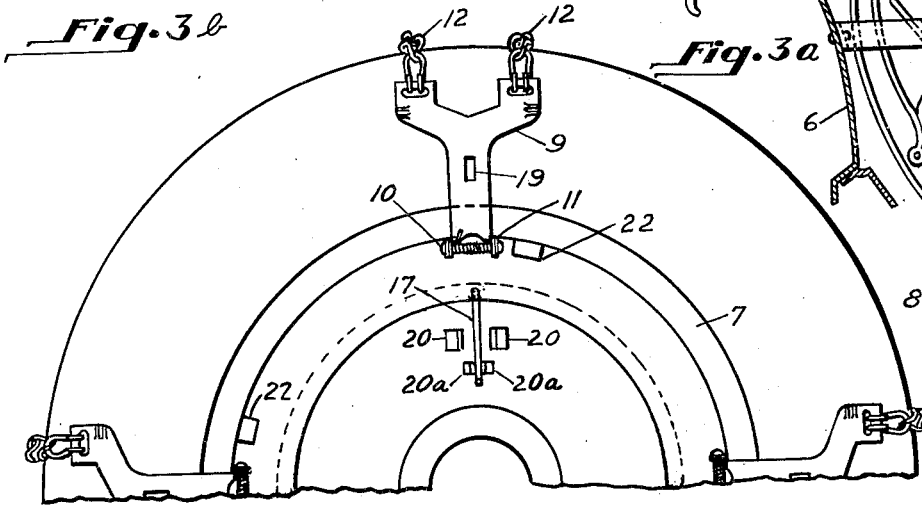
Figure 7:
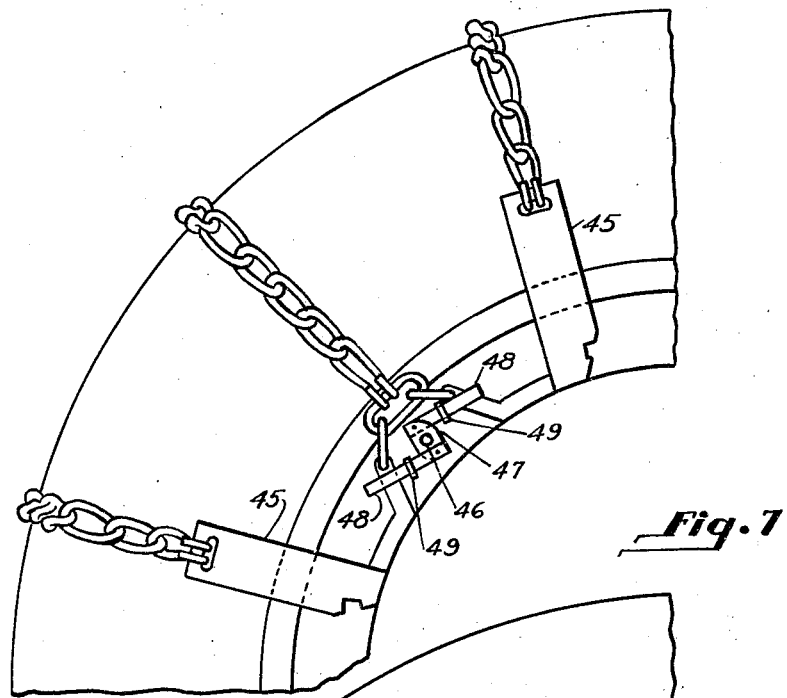
Figure 8:
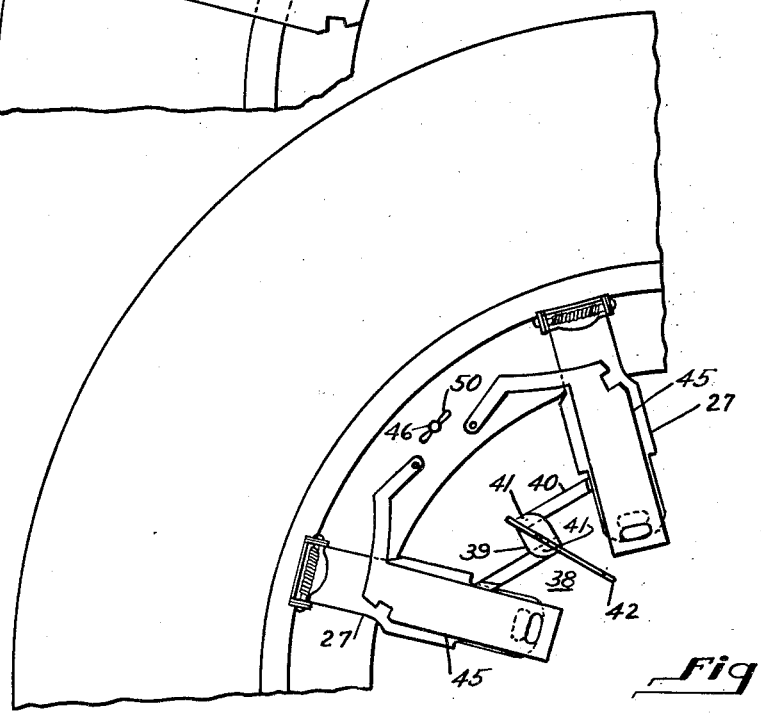

Some of the forms which my invention may take are shown in the accompanying drawings wherein Figure 1 is a cross sectional view of an automobile wheel equipped with my invention; Fig. 1a is a view of the chain-carrying elements of Fig. 1 in folded position; Fig. 2 is an elevational view of the rear side thereof; Fig. 3 is an elevational view of the outer side of the wheel; Fig. 3a shows a modification of the device of Fig. 1a; Fig. 3b is a plan view of a portion thereof; Fig. 4 is a face view of a wheel equipped with a modified form of my invention; Fig. 5 is a rear view thereof; Fig. 6 shows the chain-holding plates of Figs. 4 and 5 in folded position; and Figs. 7 and 8 are rear and front views, respectively of another modification, Fig. 8 showing the parts in their folded position.

Referring first to Figs. 1 to 3, only so much of a wheel is shown as is required for an understanding of my invention. The wheel may be of conventional form and is here shown as a disc wheel having the usual body portion 6, rim or felly portion 7 and tire 8. The antiskid device comprises a plate 9 which is hingedly connected at 10 to ears 11 which may be welded or otherwise secured to the rim 7. Cross chains 12 are connected at their outer ends to the plate 9 and at their inner or rear ends to a plate 13 which has a section 14 pivotally connected thereto at 15.

When the chains 12 are draped over an upper portion of the tire 8, the parts at the rear side thereof will hang loosely, with the plate section 14 hanging at approximately the angle indicated by dash lines in Fig. 1. In order to secure the chains in place at their rear ends, I provide a hook rod 16 that has a jointed extension or handle-like portion 17. In connecting the plates 13—14 in place at the rear side of the wheel, the rod members 16—17 are moved to the positions shown in dotted lines, the hook being upturned as indicated in dotted lines in Fig. 1, and pushed through an opening 18 in the plate member 14. Thereupon the hook is turned downwardly to engage with the member 14 and pulled to the position shown in full lines in Fig. 1, at which position the plates 13—14 will be held closely against the wheel and retained against displacement by tractive forces. Spring clips 20a are provided for retaining the rod section 17 in its folded position, when the chains are in operative position on the tire. In the arrangement shown in Figs. 1 to 3, there will be four units containing two chains each on the wheel, but a greater or less number may be employed as desired.

In order to place the units in operative position across the tread of the tire, those on the upper portion of the wheel will first be dropped across the tire and their rear ends fastened as above explained. Whereupon the vehicle can be advanced to bring other portions of the wheel uppermost for the placing of the other chains in position across the tire.

When road conditions do not require the use of the chains 12, the rod 16—17 will be operated in the reverse direction to disengage the plate 14 therefrom, whereupon the plate 9 can be folded down to its dotted line position while passing the rod section through a hole 19 in the plate, and the rear plate sections 13 and 14 also folded down to their dotted line positions, at the outer face of the wheel as shown in Fig. 1. The member 9 will be held by the clip 20a and the rod section 17, while 13—14 will be retained in their folded positions by spring clip elements 20 which are set to one side of the elements 20a. The chains 12 will be suitably draped or nested around these various members. In Fig. 1a, the clips 20b hold the plates 13—14 in overlapped relation to the plate 9 and the rod member 17. The various chain units and their associated elements, when folded in inoperative position, can be covered by a face plate or cap 21 of disc-like form, which has snap connection with yieldable ears or hooks 22, that are welded or otherwise fastened to the rim of the wheel, in a manner similar to that in which conventional hub caps are fastened to the wheel, for convenient removal.

In Figs. 3a and 3b I show a modification of the manner in which the plates 9—13—14 and the rod section 17 may be held in folded or nested position. In this arrangement the rod section 17 is swung or folded in a direction generally tangential to the disk 6 of the wheel instead of radially thereof as in Fig. 1. The bent end of the section 17 extends through a hole in the rim 7 and can have yieldable friction engagement therewith. When the antiskid elements are moved to their folded positions this rod section is overlaid by the plates 9—13—14, the plates in turn being retained in folded position by clips 24.

During summertime, when the antiskid units are not likely to be required, the plates 9—13—14, and their chains, can be removed entirely from the wheel, simply by taking out the hinge pins or bolts at 10. The rod elements 16—17 can also be removed if desired, by taking out the pivot pin 23.

Referring now to Figs. 4, 5, and 6, I show an arrangement wherein each unit comprises three cross chains instead of two cross chains. In this instance, the cross chains of each unit are designated by the numerals 25 and 26. The chains 25 at their outer ends are connected to plates 27, which are pivotally connected to the wheel rim in the same manner as are the plates 9, they being provided with springs 28 that yieldably urge them against the side of the tire. The cross chain 26 is connected to the plates 27 by a chain 29. At their rear ends the chains 25 are connected to plates 31 of angular form and the chains 26 connected to such plates by a chain 32. In this instance, the plates 31 are held in place against the rim of the wheel by hook rods 33 which have jointed extensions 34, that function in substantially the same manner as do the rod members 16—17 of Fig. 1, to engage with and hold the leg portions 35 of the angle plates 31. In this instance, as in the case of Fig. 1, when the chains are not in use, the plates 31 will be placed against the outer face of the wheel and held in place, together with the rod extensions 34.

When the parts are in operative position as shown in Figs. 4 and 5 the rod sections 34 will be held in their folded positions by spring clips 37 that are welded or otherwise secured to the rim of the wheel. When the plates 27 and 31 are stowed against the side of the wheel, in their inoperative positions, they can be held in place by first folding them down and then bringing the rod sections 34 into over-lying relation therewith as shown in Fig. 6. As an alternative arrangement, the rod members 34 can first be placed in engagement with the clips 37, whereupon the plates 27 and 31 and their cross chains will be folded against the outer face of the wheel and held in place there by a locking device 38 (Figs. 4 and 8). This device comprises a body member 39 that is rotatably connected to the wheel disk and has a pair of arms 40 pivotally connected therewith at 41, the outer ends of the arms 40 being bent outward so that they will more conveniently engage the outermost faces of the plates. The member 39 has a handle 42 by which it can simply be oscillated to effect engagement and disengagement of the arms 40 with the plates.

In Fig. 7 I show a modification of the structures Figs. 4 and 5 in that a different arrangement is provided for holding the plates 45 against the rear side of the wheel when the chains are in position across the tread of the tire. The members 45 correspond to the elements 31 of Fig. 5, the plates at the front side of the wheel being of any suitable form such as shown in Figs. 4 and 8. A shaft 46 is journaled in the rim of the wheel and has secured thereto a plate 47 to which are pivotally connected a pair of arms 48 that slide in keepers or loops 49 that are carried by the wheel rim. The outer ends of these arms 48 are curved outwardly so that they will more readily pass across the face of the plates 45 when the parts are being secured in operative position upon the wheel. The shaft 46 corresponds to the member 16 of Fig. 1 but is simply rotated by handles 50, instead of being shifted longitudinally of itself. The plates 45, when in inoperative position will be held by clamping bars 40, with the plates 27, against the face of the wheel.

I claim as my invention:

1. The combination with a vehicle wheel, of an antiskid device comprising a holding element having connection with one face of the wheel, an antiskid element connected at one end to said holding element and adapted to lie across the tread of the wheel, a second holding element connected to the other end of the antiskid element, means carried by the wheel and operable from the first-named face of the wheel, for making engagement with and releasably fastening the second holding element in place at the other face of the wheel, and means on the first-named wheel face for supporting the said three elements grouped in inoperative position at said wheel face.

2. The combination with a vehicle wheel, of an antiskid device comprising a holding element having connection with one face of the wheel, an antiskid element connected at one end to said holding element and adapted to lie across the tread of the wheel, a second holding element connected to the other end of the antiskid element, means operable from the first-named face of the wheel, for making connection with and releasably fastening the said second holding element in place at the other face of the wheel, means on the first-named wheel face for supporting the said three elements grouped in inoperative position at said wheel face, and a cover plate removably mounted at the last-named wheel face, to cover the three elements when at their inoperative positions.

3. The combination with a vehicle wheel, of an antiskid device comprising a holding element having connection with the outer face of the wheel, an antiskid element connected at one end to said holding element and adapted to lie across the wheel tread, a second holding element connected to the other end of the antiskid element, a hook bolt or the like carried by the wheel and extending therethrough and operable from the outer side of the wheel to engage the second-named holding element when at the rear side of the wheel and to pull it toward the rear face of the wheel and thereby releasably hold it and the antiskid element in operative positions.

4. The combination with a vehicle wheel, having rim and tire portions, of a plurality of antiskid devices therefor, each comprising a holding element having connection with the outer face of the wheel, an antiskid element connected at one end to said holding element and adapted to lie across the wheel tread, a second holding element connected to the other end of the antiskid element, means carried by the wheel and operable from the outer face thereof, for releasably fastening the second-named holding element in place at the other face of the wheel, means at the outer face of the wheel for supporting the various supporting elements grouped in inoperative position, against the outer face of the wheel, and a cover plate removably mounted on the outer face of the wheel, to cover the said elements when in their inoperative positions.

5. The combination with a vehicle wheel having rim and tire portions, of an antiskid device comprising a plate pivotally connected to the rim, at the outer face of the wheel, an antiskid element connected at one end to said plate, and adapted to lie across the wheel tire, a second plate connected to the other end of the antiskid element and having a hinged joint intermediate its ends, whereby it may be caused to conform generally to the contour of the adjacent side of the tire and rim at the rear face of the wheel, a hook member operable from the outer face of the wheel to engage the second-named plate and fasten it in place in proximity to the rear side of the rim, and retaining means at the outer face of the wheel, the said plates being foldable against the outer face of the wheel in position to be held in place by the said retaining means.

6. The combination with a vehicle wheel, of an antiskid device comprising a holding element mounted on the wheel, at the outer face thereof, an antiskid element connected at one end to said holding element and adapted to lie across the wheel tread, a second holding element connected to the other end of the antiskid element, a hook bolt or the like rotatably supported by the wheel and extending therethrough from the outer side thereof, to make hooked engagement with the second-named holding element, and means for releasably maintaining the said bolt in hooked engagement with the last-named element.

7. The combination with a vehicle wheel, of an antiskid device comprising a holding element mounted on the wheel, at the outer face thereof, an antiskid element connected at one end to said holding element and adapted to lie across the wheel tread, a second holding element connected to the other end of the antiskid element, a hook bolt or the like rotatably supported by the wheel and extending therethrough from the outer side thereof, to make hooked engagement with the second-named holding element, and means for releasably maintaining the said bolt in hooked engagement with the last-named element, the bolt being slidable in the wheel and having its outer portion foldable against the outer face of the wheel.

8. The combination with a vehicle wheel, of an antiskid device comprising a holding element mounted on the wheel, at the outer face thereof, an antiskid element connected at one end to said holding element and adapted to lie across the wheel tread, a second holding element connected to the other end of the antiskid element, a hook bolt or the like movably supported by the wheel and extending therethrough from the outer side thereof, to make hooked engagement with the second-named holding element, and means for releasably maintaining the said bolt in hooked engagement with the last-named element.

FRANCIS A. BERNER.